C. W. SKIFF.
APPLIANCE FOR MILK BOTTLES.
APPLICATION FILED MAY 6, 1916.
1,242,994.
Patented Oct. 16, 1917
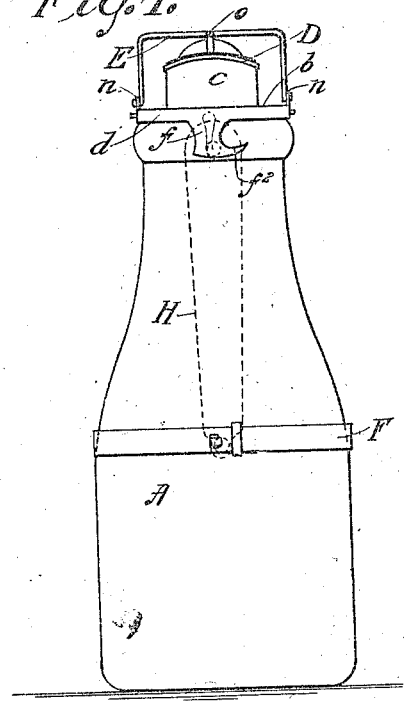
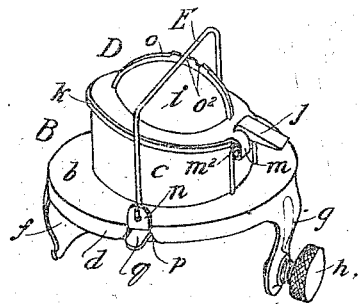
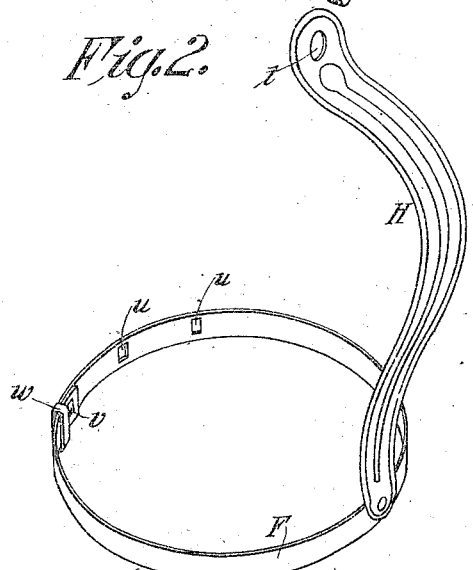
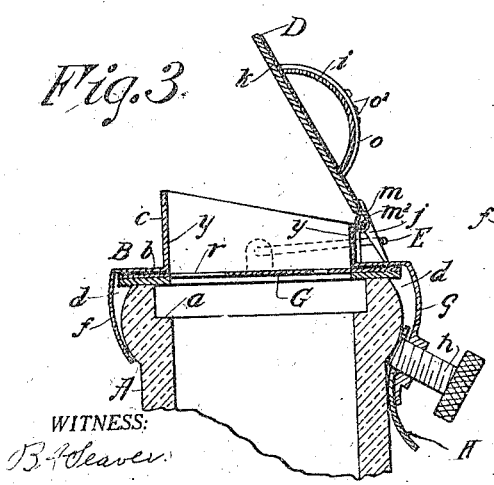
WITNESS:
B. J. Weaver
INVENTOR,
Chas. W. Skiff,
BY
ATTORNEY.

UNITED STATES PATENT OFFICE.

CHARLES W. SKIFF, OF WESTFIELD, MASSACHUSETTS, ASSIGNOR TO C. W. SKIFF COMPANY, OF WESTFIELD, MASSACHUSETTS, A CORPORATION OF MASSACHUSETTS.

APPLIANCE FOR MILK-BOTTLES.

1,242,994.   Specification of Letters Patent.   Patented Oct. 16, 1917.

Application filed May 6, 1916. Serial No. 95,847.

*To all whom it may concern:*

Be it known that I, CHARLES W. SKIFF, a citizen of the United States of America, and resident of Westfield, in the county of Hampden and State of Massachusetts, have invented certain new and useful Improvements in Appliances for Milk-Bottles, of which the following is a full, clear, and exact description.

This invention relates to an improved appliance to be detachably connected on the top of a milk bottle or other receptacle, and to effectively and tightly close the receptacle, to permit readily the swinging to open position of the cover with which the appliance is provided whereby the liquid may be poured out, to insure the retention or locking of the cover, temporarily, in open position to conduce to increased convenience of use, to provide that the cover when closed will accommodate itself to the upper open end of the delivery spout of the device, to provide a handle device whereby the bottle and this improved appliance thereon may be used as a pitcher, to provide means for the removal, from the mouths of bottles, of paper caps with which bottles of milk and cream are commonly supplied, to provide a simply constructed and readily engaged member to serve as a cream separator, and for the attainment of other objects and advantages hereinafter rendered manifest.

The invention is described in conjunction with the accompanying drawings and is set forth in the claims.

In the drawings:—

Figure 1 is a front elevation showing a milk bottle and the appliance comprising my present improvements applied thereon.

Fig. 2 is a perspective view of the complete appliance, parts thereof being shown as disengaged one from another.

Fig. 3 is a sectional view as taken from front to rear through the mouth portion of a milk bottle and the improved appliance therefor.

Fig. 4 is an inverted plan view of the cap showing the cream eparator as engaged therewithin.

In the drawings, A represents a milk bottle of a kind commonly and extensively used, the same having at its mouth portion the internal seat $a$ to receive a paper disk applied therein by the milk dealer, and for closing the receptacle during transportation and delivery.

B represents my improved cap and its appurtenances. The cap includes a base or body portion $b$ having the form of an annulus, and is made with an upwardly open tubular pouring spout $c$ of reduced diameter and having the upper end thereof forwardly and upwardly inclined.

The base portion $b$ of the cap is provided with a depending marginal flange $d$, which flange at front and rear is downwardly continued in the ears or prongs $f$ and $g$ to constitute clips for engagement down around and under the external bead of the bottle mouth.

$h$ represents a binding screw having a thread engagement through the ear or prong $g$ for constituting a means to positively, though detachably, confining the cap on the bottle.

The forward prong $f$ is made with a lateral pointed projection $f^2$, which may be utilized by grasping the cap preparatory to securing it on the bottle to pierce and hook into the paper cap or disk for its removal from the bottle mouth.

D represents a circular cover pivotally connected to the upper portion of the spout at the rear side thereof, the same having a rounding top $i$ and an integrally formed rearwardly extended lever arm $j$.

This cover has on its under side a layer $k$ of non-metallic and preferably compressible material, rubber, for instance; and, in order that the cap may accommodate itself for a good seat on the end of the spout, irrespective of the thickness of the layer $k$, or the degree to which the same has become worn or compressed, the pivotal connection between the cover and the spout is a loose one.

In this connection attention is called to Figs. 2 and 3, wherein the cover is made with a rearwardly extended tongue $m$ bent around to form an elongated eye through which the pivot forming member $m^2$ engages.

E represents a bail pivotally connected to ear lugs $n$, $n$ at the opposite lateral sides of the cap.

The rounded or dome shaped cover is formed with an upstanding rib $o$, extending in a line from rear to front of the top and having spaced upwardly opening notches $o^2$ therein.

The said bail E is adapted when swung in one direction to confine the cover with a yielding pressure in its spout closing position by impingement against the rounding top of such cover, its retention against dislodgement from the cover being insured by its engagement in one of said notches.

By swinging the bail rearwardly it will engage the arm $j$ and swing the cover to the open position shown in Fig. 3.

The bail in approaching the rearward limit of its swinging movement will be crowded against its resiliency and develop a spring reaction whereby it will remain at the limit to which it is swung and serve as a lock to temporarily hold the cover in its open position.

The thin metal of which the spout is composed provides a sharp pouring edge whereby the dripping of milk or cream following the pouring is precluded.

The depending annular flange has the bail connection ear lugs $n$ $n$ by proper incisions produced and upwardly turned from opposite portions thereof, leaving the downwardly opening recesses $p$ $p$.

G represents a circular disk or thin plate to be inserted under the cap and within its depending flange $d$, the same having opposite lateral projections engaged in said recesses $p$.

This plate has an aperture $r$ therein forward of its center, and having its location about at the junction of the tubular spout, and the base or body $b$ of the cap.

This apertured disk serves as a device to separate the cream from the milk during the pouring action, as the cream at the top will bank up against the portion of the plate above or to the rear of the aperture, while the milk is passing through the latter and be retained within the bottle.

The projections $q$ $q$ engaging in the recesses $p$ $p$ prevent rotative displacement of the disk whereby the aperture therein would not be properly positioned.

A handle forming appliance is shown consisting of a band F of thin metal to have an encircling engagement around the body of the bottle, and said band having connected thereto an upwardly extending outwardly bowed handle forming member H.

The upper end of the handle forming member H has an aperture $t$ therein, and such apertured end is adapted to have an overlapping relation to the ear $g$ of the cap, and to be confined on the bottle by the same binding screw $h$ as serves for the confinement of the cap.

The encircling band F is made so as to be expansible and contractible, whereby to fit different size milk bottles, as, for instance, both quarts and pints.

The band, therefore, is made with its ends overlapped and slidable around relatively to each other; one end portion of the band having apertures $u$ therein, and the other a tongue $v$ for engagement in either of the apertures; and one end portion of the band has a loop or keeper $w$ for holding the other end portion in close relation thereto.

The inner surface of the spout may have a glazed or enamel covering $y$, is desired.

A bottle of milk, etc., having my improved appliance thereon, may be used without liability of the milk dripping down the outside of the bottle during or after pouring; the milk may be contained in and poured from the bottle without being affected by contact with metal surfaces; the paper closing disk may be readily removed from its engagement in the mouth of the bottle by the part $f$, $f^2$ comprised in the cap; the bottle may be laid down, tipped over, packed in ice, or lunch baskets, and carried in automobiles or other vehicles without liability of leakage, and it is at all times a protector of the milk from flies, dirt and dust and germs; and by the provision of the adjustable handle, the bottle becomes converted into a pitcher, saves the pouring of the milk into another receptacle for table use, and renders it possible to pour out the milk with one hand whereas of many persons the employment of both hands would be required.

I claim:—

1. A cap having means for its detachable connection on the mouth portion of a bottle and having an upwardly extending tubular spout of less diameter than the cap proper, a cover pivotally connected to one side of the spout, having a rearwardly extending arm, and a bail hinged to the cap and adapted to engage the top of the cover and also said arm, a band circumferentially adjustable and having means for its detachable confinement about the body of the bottle and having an upwardly extending outwardly bowed handle member, and a single means for the detachable connection of said handle member and said cap and to effect a seating of said cap.

2. A cap, having depending ears to engage about different portions of a bottle top, having a binding screw threading through one of the ears to effect a firm seating of the cap on the bottle, and provided with an upstanding upwardly open tubular spout, a cover pivotally connected to the upper portion of said spout, having an arm extending rearwardly beyond the pivotal connection and having a rounding top, a bail pivotally connected to the cap at opposite sides of the spout and adapted when swung in one direction to confine the cover in its spout closing position, and when swung in the opposite direction to engage said arm to swing the cover to, and hold it in, its open position, and an appliance comprising a band to encircle the body of the bottle, and an upwardly extending outwardly bowed handle member connected to the band, the upper end portion of which is apertured and adapted to be confined by said binding screw in relation to the mouth portion of the bottle.

3. A cap, having depending ears to engage about different portions of a bottle top, having a binding screw threading through one of the ears, and provided with an upstanding upwardly open tubular spout, a cover pivotally connected to the upper portion of said spout, having an arm extending rearwardly beyond the pivotal connection and having a rounding top, a bail pivotally connected to the cap at opposite sides of the spout and adapted when swung in one direction to confine the cover in its spout closing position, and when swung in the opposite direction to engage said arm to swing the cover to, and hold it in, its open position, and an appliance comprising a band of thin metal, to encircle the body of the bottle, having its end portions overlapped and one end of the band slidable around relatively to the other, one end portion of the band having apertures, and the other a tongue for engagement in either of the apertures, and one end portion of the band having a loop for holding the other end portion in close relation thereto, and an upwardly extending outwardly bowed handle member constituting the sole means of connection between the band and the cap.

4. A cap provided with a depending flange adapted to engage about the mouth portion of a bottle and provided with an upwardly extending and upwardly open spout, said flange having opposite recesses therein, a cover hinge connected to and for closing the spout provided with a rounded top and a rearwardly extended arm, a bail hinged to opposite sides of the cap and for engaging either the rounded top of the cover or said arm, and a plate to be set within the flange bordered base of the cap provided with opposite outwardly extending ears to be engaged in said flange recesses and having an aperture located forwardly in relation to its center, said so-formed and so engaged plate constituting a cream separator.

5. A cap having means for its detachable connection with the mouth portion of a bottle and provided with an upstanding upwardly open tubular spout, a cover pivotally connected to the upper portion and at one side of said spout, having an arm extending rearwardly beyond the pivotal connection, and having a dome-shaped top, formed with an upstanding rib extending in a line from rear to front of such top and having spaced upwardly open notches therein, a bail made of spring wire pivotally connected to the cap at opposite sides of the spout and adapted when swung in one direction to engage in said rib notches, and when swung in the opposite direction to engage said arm to swing the cover to, and hold it in its open position.

6. A circular cap having a depending annular flange, from opposite portions of which upwardly turned ear lugs are formed, leaving downwardly opening recesses in such flange and having an upwardly extending tubular pouring spout, a cover hinged to the rear side of the spout, having an upwardly rounded top and a rearwardly extending arm, a bail connected to the said ear lugs and adapted to have retaining engagements with said rounded top and said bail, means for detachably holding the cap on the mouth of a bottle, and a circular plate under the cap within said depending flange, having opposite lateral projections engaged in said recesses, and having an aperture therein forward of the center thereof.

Signed by me at Springfield, Mass., in presence of two subscribing witnesses.

CHARLES W. SKIFF.

Witnesses:
WM. S. BELLOWS,
G. R. DRISCOLL.